Oct. 22, 1929.   P. INVERNIZZI   1,732,405
MOTOR AND TRANSMISSION UNIT
Filed July 19, 1926
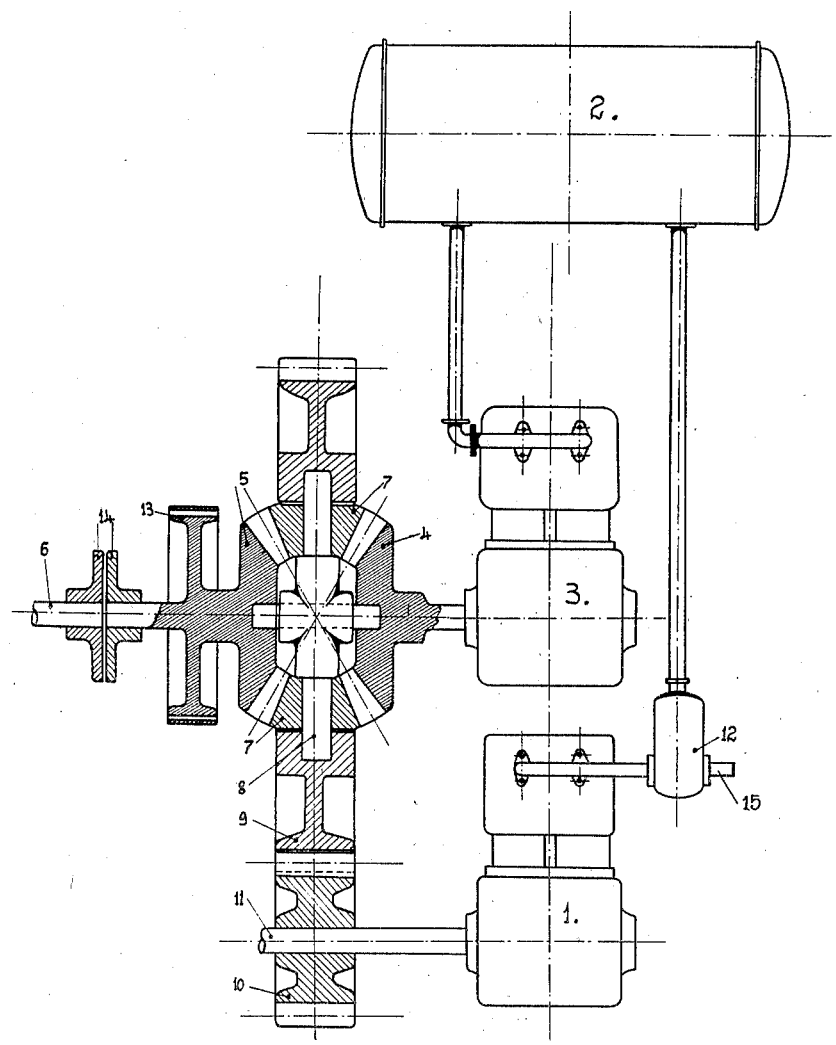
Inventor,
Pietro Invernizzi,
By
Atty Patented Oct. 22, 1929

1,732,405

UNITED STATES PATENT OFFICE

PIETRO INVERNIZZI, OF TURIN, ITALY

MOTOR AND TRANSMISSION UNIT

Application filed July 19, 1926, Serial No. 123,542, and in Italy July 20, 1925.

This invention has for its object to provide a motor and transmission unit, more particularly adapted for driving machines that have to overcome resistances of wide variation, as for instance motorcars, characterized by a combustion engine, preferably of the explosion type, the power of which varies automatically according to the resistance to be overcome.

Said variation of power is obtained preferably by feeding the engine by means of a compressor driven by the engine itself through a differential gear effecting at the same time the transmission, so that the speed of this latter and of the compressor are inversely proportional to the corresponding resistances.

It will be seen that by increasing the resistance to the transmission, this latter decreases its speed causing a corresponding speed increase of the compressor to take place, so that the engine will be more abundantly fed.

The engine will therefore increase its power in accordance with the increase of resistance, preventing a further decrease of speed of the transmission without varying the speed of the engine. The speed of this latter may be controlled by varying its charge degree or the rate of delivery of the compressor.

By using this motor-transmission unit, the change speed gear may be dispensed with as the arrangement will work as a steam engine.

The annexed drawing shows diagrammatically a constructional form of the invention.

1 denotes an explosion engine working according to Lenoir's two stroke cycle modified in that instead of drawing the mixture at the atmospheric pressure it receives the same already compressed by air from a tank 2 fed by a compressor 3.

This latter is coupled with a sun wheel 4 of a differential gear, the other sun wheel 5 of which is coupled with the driven shaft 6, while the planet wheel 7 engaging with the sun wheels 4 and 5 is mounted on a spider 8 connected with a crown wheel 9 driven by the punion 10 of the driving shaft 11.

A carburetor 12 is arranged on the tube leading from the tank 2 to the engine 1.

A brake 13 is attached to the sun wheel 5 and the driven shaft 6 is interrupted by a friction clutch 14.

The charge is fed into the engine 1 and fills the compression chamber and is caused to explode in the known manner. The driving shaft in turning takes along the crown wheel 9, which in its turn drives through the planet wheel 7 the sun wheels 4, 5 at a speed inversely proportional to their resistance. The compressor 3 is thus operated and feeds compressed air to the tank 2, from which said air passes to the carbureter 12 which at the same time receives the fuel from the tube 15 connected with a tank (not shown) containing the combustible fuel.

If the resistance to be overcome by the shaft 6 increases, said shaft will turn more slowly producing a proportional increase of speed of the compressor 3, that will convey a greater charge into the tank 2 increasing its pressure, thus increasing the charge of the engine 1 and its power. The engine will thus withstand the increased resistance without accelerating its speed.

The speed variations of the engine and shaft 6, independently from the resistance, are obtained by varying the charge of the engine or delivery of the compressor.

To start the motor unit, particularly when it is applied to a motor vehicle, the friction clutch 14 is disengaged and the brake 13 applied, so that the wheel 5 cannot turn any more and by causing the shaft 11 to rotate either by hand or through a starting motor; the compressor will be simultaneously operated; once the starting is effected, the brake is released and the clutch engaged.

This last arrangement serves also for disengaging the clutch without stopping the engine; in fact if the disengagement of the clutch is effected without braking the wheel 5, this latter would be completely released and would begin to rotate at a speed twice that of the spider 8, while the compressor would stop.

The combined clutch and brake arrangement is not indispensable when the charge of the engine may be reduced to very low limits so that its power will not be sufficient to overcome the resistance of the shaft 6 but will operate the compressor at a low speed; in this case it will be seen that at the lowest charge the motor vehicle or machine to which the unit is applied will not be started as long as the engine works at a reduced charge. This arrangement may of course be used in connection with four stroke or two stroke normal engines, in which case the compressor to be superfed will work; moreover the details of construction of this unit may be varied without departing from the spirit of this invention.

What I claim is:

1. A motor transmission unit comprising an internal combustion engine, a device for the formation of the mixture for said engine, a compressor including an operating shaft, tank for the pressure air, conduits for connecting the tank with the compressor and with said device, a driven shaft, a differential mechanism comprising a spider, sun wheels connected with the compressor shaft and the driven shaft and planet wheels carried by the spider set into rotation through the engine shaft.

2. A motor transmission unit comprising an internal combustion engine, a device for the formation of the fuel mixture for said engine, a compressor including an operating shaft, tank for the pressure air, conduits for connecting the tank with the compressor and with said device, a driven shaft, a differential mechanism connecting said driven shaft with the compressor shaft and operated by the engine, a clutch mechanism arranged in the driven shaft, and a brake between said clutch and the differential mechanism.

3. The combination with an explosion engine, a driving shaft operated thereby, a driven shaft, a fuel supplying device, a compressor, a tank connected with the compressor and with said device, and a shaft for operating the compressor, of a differential mechanism and a crown wheel carrying the latter operatively connected to the driving shaft, the sun wheels of the differential mechanism being connected with the compressor and driven shafts.

4. The combination with an explosion engine, of mechanism to automatically vary the power of the engine in accordance with the variation of resistance to the operation of the engine to maintain the speed of the latter constant, said mechanism comprising a compressor, a shaft for operating the latter, a tank for the pressure air, conduits connecting said tank with the compressor and the engine, a driven shaft, and a differential mechanism operated by the engine arranged between the driven and compressor shafts.

In testimony that I claim the foregoing as my invention, I have signed my name.

PIETRO INVERNIZZI.